US009811537B2

(12) United States Patent
Geva et al.

(10) Patent No.: US 9,811,537 B2
(45) Date of Patent: *Nov. 7, 2017

(54) PRODUCT IDENTIFICATION VIA IMAGE ANALYSIS (71) Applicant: International Business Machines Corporation, Armonk, NY (US)

(72) Inventors: Amir Geva, Yoneam (IL); Mattias Marder, Haifa (IL); Yoav Nahshon, Tsorit (IL); Amnon Ribak, Misgav (IL)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/156,357

(22) Filed: May 17, 2016

(65) Prior Publication Data
US 2016/0260057 A1 Sep. 8, 2016

Related U.S. Application Data (63) Continuation of application No. 14/582,225, filed on Dec. 24, 2014, now Pat. No. 9,442,958.

(51) Int. Cl.
*G06K 9/62* (2006.01)
*G06F 17/30* (2006.01)
(Continued)

(52) U.S. Cl.
CPC .. *G06F 17/30256* (2013.01); *G06F 17/30247* (2013.01); *G06K 9/4604* (2013.01);
(Continued)

(58) Field of Classification Search
CPC ........ G06Q 30/02; G06Q 10/087; G06K 9/62; G06K 9/4604; G06K 9/6215
See application file for complete search history.

(56) References Cited

U.S. PATENT DOCUMENTS

| 8,639,041 B2 | 1/2014 | Grigsby et al. |
| 2004/0020091 A1 | 2/2004 | Johnson et al. |

(Continued)

FOREIGN PATENT DOCUMENTS

WO   2013191598   12/2013

OTHER PUBLICATIONS

Disclosed Anonymously., "Smarter Supermarket Way Finding", An IP.com Prior Art Database Technical Disclosure, Aug. 17, 2011, Can be found at: http://ip.com/IPCOM/000209828.

(Continued)

*Primary Examiner* — Stephen R Koziol
*Assistant Examiner* — Shaghayegh Azima
(74) *Attorney, Agent, or Firm* — Daniel Kligler (57) ABSTRACT

A method includes identifying, in an image, a shelf, a price tag affixed to the shelf, a first group of one or more first products resting on the shelf and positioned on a first side of the price tag, and a second group of one or more second products resting on the shelf and positioned on a second side of the price tag. One or more first candidates are identified for the one or more first products, and one or more second candidates are identified for the one or more second products. Upon receiving information indicating expected locations for the first and the second candidates, determining, an identity of the first products can be determined based on the expected locations and the one or more first candidates, and an identity of second products can be determined based on the expected locations and the one or more second candidates.

15 Claims, 3 Drawing Sheets

(51) Int. Cl.
    *G06Q 10/08*     (2012.01)
    *G06K 9/46*     (2006.01)
    *H04N 5/225*     (2006.01)

(52) U.S. Cl.
    CPC ......... *G06K 9/6202* (2013.01); *G06K 9/6215* (2013.01); *G06Q 10/087* (2013.01); *H04N 5/2257* (2013.01)

(56) References Cited

U.S. PATENT DOCUMENTS

| | | |
|---|---|---|
| 2010/0070365 A1 | 3/2010 | Siotia et al. |
| 2011/0004571 A1 | 1/2011 | Parikh et al. |
| 2011/0011936 A1* | 1/2011 | Morandi .................. G06K 9/00 235/454 |
| 2013/0173435 A1* | 7/2013 | Cozad, Jr. ............ G06Q 10/087 705/28 |
| 2014/0003729 A1 | 1/2014 | Auclait et al. |
| 2015/0235157 A1* | 8/2015 | Avegliano ........ G06Q 10/06315 705/7.25 |
| 2015/0262116 A1* | 9/2015 | Katircioglu ........ G06K 9/00771 705/28 |

OTHER PUBLICATIONS

Wang, C.-C., "Display Online Store Products by Automatic Merchandise Classification Based on Product Similarity", Management of Innovation and Technology, 2008. ICMIT 2008. 4th IEEE International Conference, Sep. 21-24, 2008, pp. 710-715.

\* cited by examiner

PRODUCT IDENTIFICATION VIA IMAGE ANALYSIS

FIELD OF THE INVENTION

The present invention relates generally to digital image analysis, and specifically to using price tags affixed to shelves to help identify multiple different products resting on one or more shelves.

BACKGROUND

When managing merchandising facilities, recognizing multiple products on shelves can be an important enabler to many software applications used to manage the facilities. However, products on the same or nearby shelves are typically from the same family of products, and correctly identifying each of the products can be challenging. Additionally, different package sizes (like 375 grams, 500 grams, 700 grams and one kilogram) of the same product may all look similar to each other, and products in the same 'family' tend to look alike (e.g. shampoo and conditioner bottles) with only small variations in color and/or text on the packaging.

The description above is presented as a general overview of related art in this field and should not be construed as an admission that any of the information it contains constitutes prior art against the present patent application.

SUMMARY

There is provided, in accordance with an embodiment of the present invention a method, including identifying, in an image, a shelf, a price tag affixed to the shelf, a first group of one or more first products resting on the shelf and positioned on a first side of the price tag, and a second group of one or more second products resting on the shelf and positioned on a second side of the price tag, identifying one or more first candidates for the one or more first products and one or more second candidates for the one or more second products, receiving information indicating expected locations for the first and the second candidates, determining, based on the expected locations and the one or more first candidates, an identity of the one or more first products, and determining, based on the expected locations and the one or more second candidates, an identity of the one or more second products.

There is also provided, in accordance with an embodiment of the present invention an computer system, including a memory configured to store an image, and a processor configured to identify in the image, a shelf, a price tag affixed to the shelf, a first group of one or more first products resting on the shelf and positioned on a first side of the price tag, and a second group of one or more second products resting on the shelf and positioned on a second side of the price tag, to identify one or more first candidates for the one or more first products and one or more second candidates for the one or more second products, to receive information indicating expected locations for the first and the second candidates, to determine, based on the expected locations and the one or more first candidates, an identity of the one or more first products, and to determine, based on the expected locations and the one or more second candidates, an identity of the one or more second products.

There is further provided, in accordance with an embodiment of the present invention a computer program product, the computer program product including a non-transitory computer readable storage medium having computer readable program code embodied therewith, the computer readable program code including computer readable program code configured to identify, in an image, a shelf, a price tag affixed to the shelf, a first group of one or more first products resting on the shelf and positioned on a first side of the price tag, and a second group of one or more second products resting on the shelf and positioned on a second side of the price tag, computer readable program code configured to identify one or more first candidates for the one or more first products and one or more second candidates for the one or more second products, computer readable program code configured to receive information indicating expected locations for the first and the second candidates, computer readable program code configured to determine, based on the expected locations and the one or more first candidates, an identity of the one or more first products, and computer readable program code configured to determine, based on the expected locations and the one or more second candidates, an identity of the one or more second products.

BRIEF DESCRIPTION OF THE DRAWINGS

The disclosure is herein described, by way of example only, with reference to the accompanying drawings, wherein.

DETAILED DESCRIPTION OF EMBODIMENTS

Overview

When analyzing product inventory placement in a merchandising facility, image recognition may not be practical when an image of a shelf is captured from a distance (e.g., one meter) that may be required to capture a reasonable section of the shelf. Optical recognition engines are typically non-deterministic, and are likely to output false positive results, unless they apply low thresholds and filter out results of low probability, in which case the risk of false negatives and missed products is increased.

Embodiments of the present invention provide methods and systems for accurately identifying products resting on shelves in a merchandising facility. As described hereinbelow, processing an image of products resting on a shelf may comprise using an image recognition algorithm in order to find the location of one or more price tags within a captured image. Additionally, database tables can be used to obtain additional information about relative location of products and their respective price tags, in order to filter out false recognition results, thereby reducing ambiguity.

In some embodiments, upon capturing an image of multiple different products resting on a shelf, the image can be analyzed in order to identify the shelf, a price tag affixed to the shelf, a first group of one or more first products resting on the shelf and positioned on a first side (e.g., to the left) of the price tag, and a second group of one or more second products resting on the shelf and positioned on a second side (e.g., to the right) of the price tag. In embodiments of the present invention, the one or more first products are identical (e.g., one liter bottles of cola), and the one or more second products are also identical, and differ from the one or more first products (e.g., two liter bottles of cola).

Upon analyzing the image, one or more first candidates for the products in the first group and one or more second candidates for the products in the second group can be identified by comparing images of the products in the first and the second groups to product images stored in a product database table. The candidates comprise images in the database that are detected to be similar to the captured product images.

Using information indicating expected locations for the first and the second candidates, respective identities of the one or more first products and the one or more second products can be identified. In embodiments of the present invention, the identity of the one or more first products can be identified based on the expected locations and the one or more first candidates, and the identity of the one or more second products can be identified based on the expected locations and the one or more second candidates.

In some embodiments, the information indicating the expected locations for the first and the second candidates may comprise a data table such as a planogram. Planograms are visual representations of a store's products or services, and typically comprise diagrams or models that indicate the placement of products on shelves. Planograms are typically used to define respective locations and quantity levels for products placed on a shelving unit.

System Description

Figure 1:
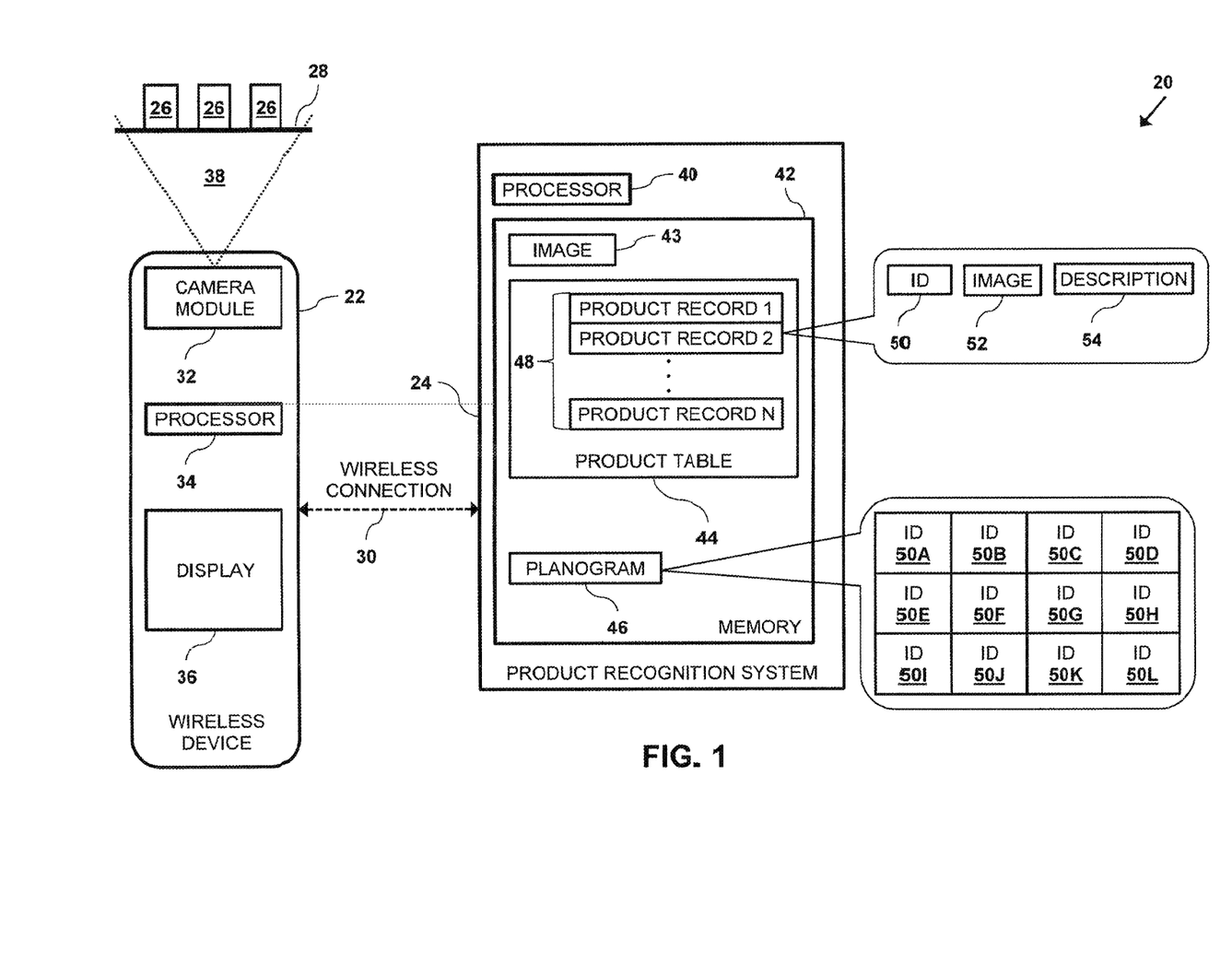
FIG. 1 is a block diagram of a facility configured to capture a digital image, and to identify products in the image, in accordance with an embodiment of the present invention.

FIG. 1 is a block diagram of a facility 20 comprising a wireless device 22 and a product recognition system 24 configured to identify products 26 resting on a shelf 28, in accordance with an embodiment of the present invention. In the example shown in FIG. 1, device 22 comprises a portable device such as a smartphone or a tablet computing device that is configured to communicate with product recognition system 24 via a wireless connection 30. While the example in FIG. 1 shows device 22 communicating with system via wireless connection 30, any other type of wireless or wired (i.e., network) connection is considered to be within the spirit and scope of the present invention.

Wireless device 22 comprises a camera module 32, a device processor 34 and a display 36. In operation, camera module is configured to capture images within a field of view 38, and processor 34 is configured to present the images on display 36, and to convey the images to product recognition system 24 via wireless connection 30.

Product recognition system 24 comprises a system processor 40 and a memory 42. Memory 42 may comprise volatile memory such as dynamic random access memory (DRAM) or non-volatile memory such as a hard disk or a solid-state disk (SSD).

Memory 42 stores an image 43 that processor 40 receives from wireless device 22, a product table 44 and a planogram 46. Product table 44 comprises multiple records 48, wherein each product 26 has a corresponding record 48. Each product record corresponds to a given product 26, and comprises a product identifier 50 (e.g., a stock number) for the given product, an image 52 of the given product, and a description 54 for the given product. Description 54 can store information for the given product such as price, packaging dimensions, name and weight.

In the example shown in FIG. 1, planogram 46 comprises a 4×3 grid of product identifiers 50 that can be differentiated by appending a letter to the identifying numeral, so that the planogram comprises product identifiers 50A-50L. The grid of the product identifiers indicates the expected layout of products 26 on shelves 28. In the example, the expected layout comprises three shelves 28 (i.e., each of the shelves corresponds to a given row in the grid), and each of the shelves stores four items 26.

Processors 34 and 40 typically comprise general-purpose computers, which are programmed in software to carry out the functions described herein. The software may be downloaded to device 22 and system 24 in electronic form, over a network, for example, or it may be provided on non-transitory tangible media, such as optical, magnetic or electronic memory media. Alternatively, some or all of the functions of processors 34 and may be carried out by dedicated or programmable digital hardware components, or using a combination of hardware and software elements.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Image Processing and Product Recognition

Figure 2:
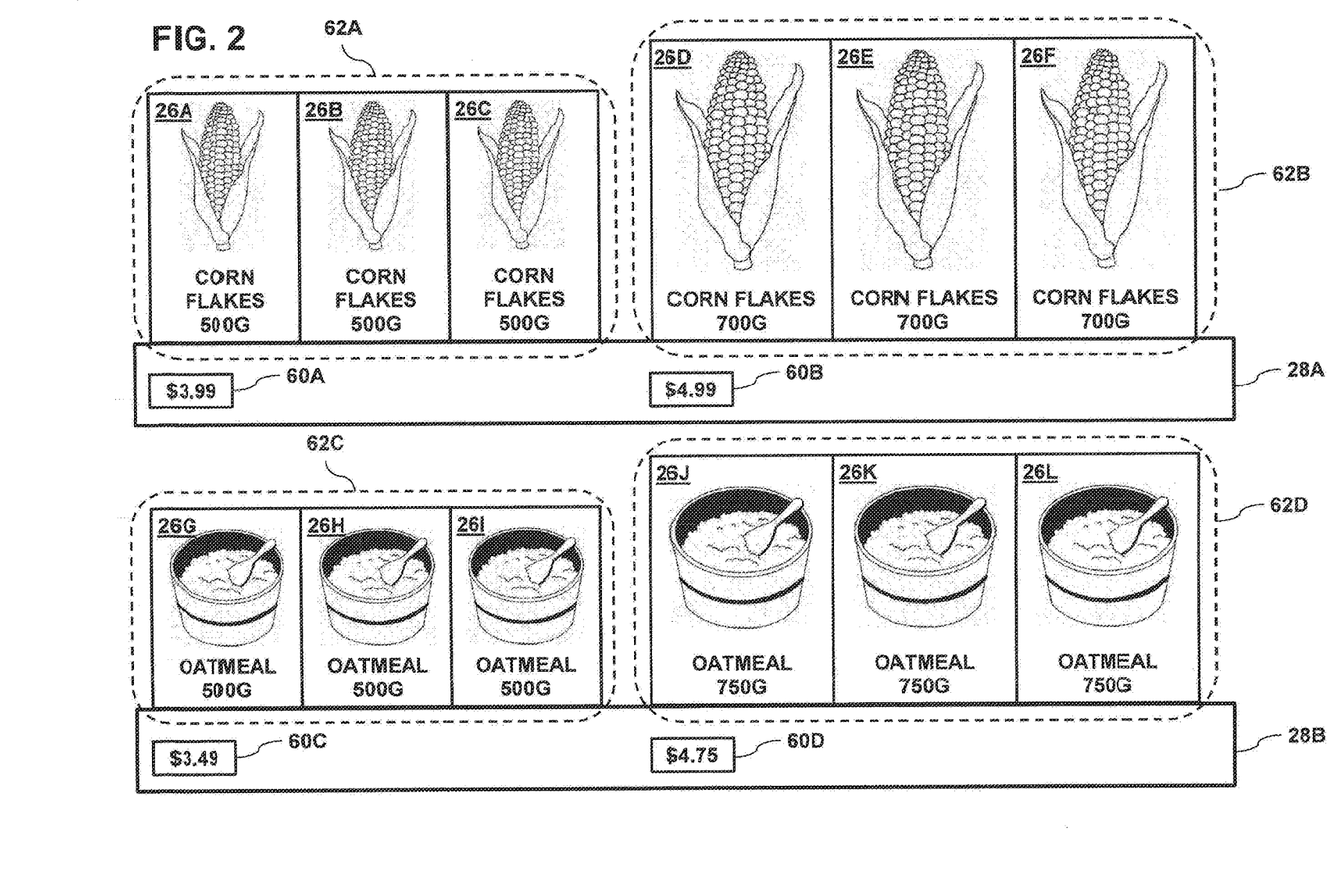
FIG. 2 is a schematic pictorial illustration of the products resting on shelves, in accordance an embodiment of the present invention.

FIG. 2 is a schematic pictorial illustration of products resting on shelves 28, in accordance an embodiment of the present invention. As shown in FIG. 2, price tags 60 (e.g., stickers) are affixed to shelves 28. Additionally, as described hereinbelow in the description referencing FIG. 3, identical products 26 can be grouped into groups 62.

In the example shown in FIG. 2, products 26, shelves 28, price tags 60 and groups 62 can be differentiated by appending a letter to the identifying numeral, so that the products comprise products 26A-26L, the shelves comprise shelves 28A and 28B, the price tags comprise price tags 60A-60D, and the groups comprise groups 62A-62D. As shown in FIG. 2, group 60A comprises products 26A-26C, group 60B comprises products 26D-26F, group 60C comprises products 26G-26I, and group 60D comprises products 26J-26L. As shown in the Figure, Products 26A-26 comprise boxes of Corn Flakes having a weight of 500 grams (G), products 26D-26F comprise boxes of Corn Flakes having a weight of 700G, products 26G-26I comprise boxes of Oatmeal having a weight of 500G, and products 26J-26L comprise boxes of Oatmeal having a weight of 750G.

Figure 3:
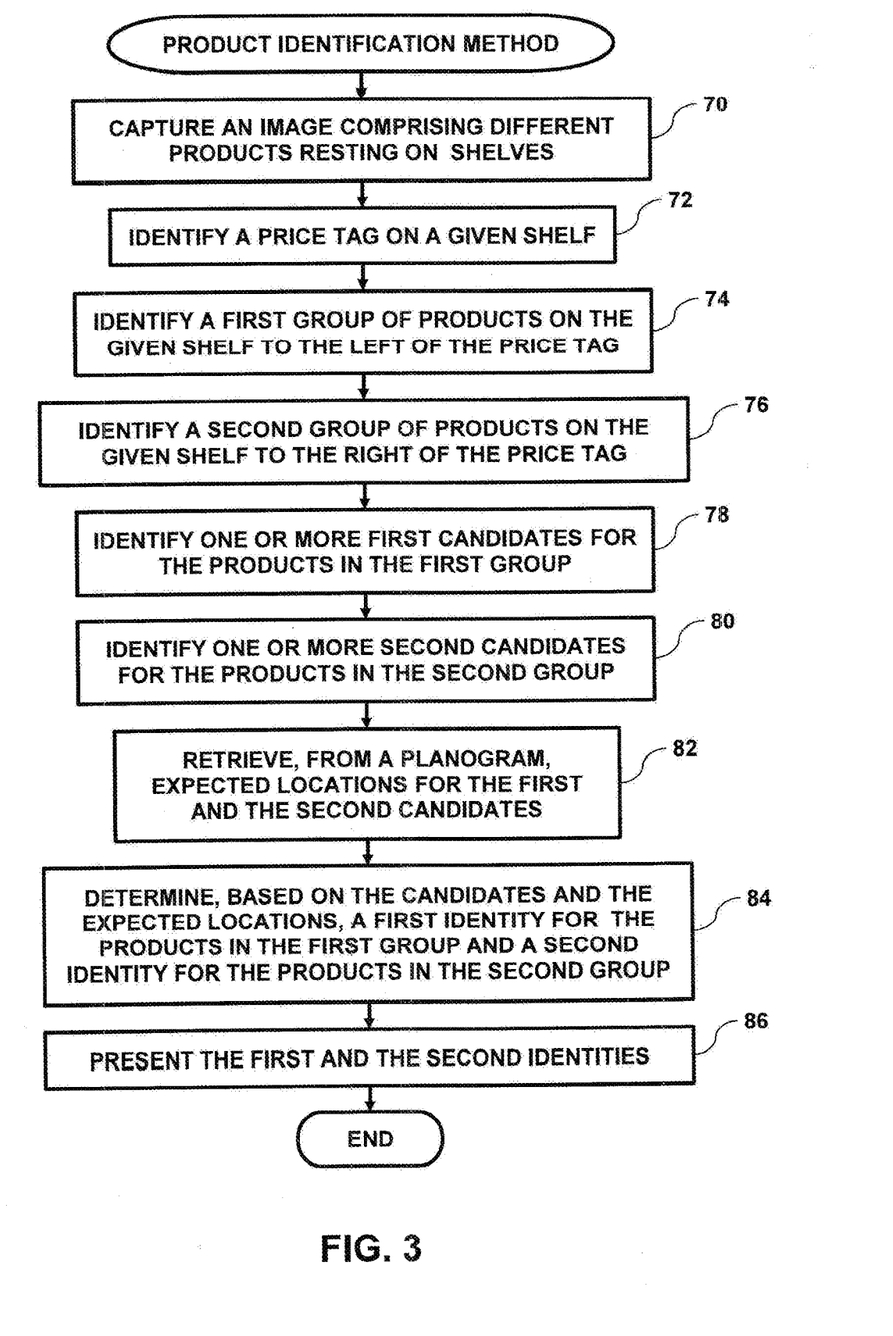
FIG. 3 is a flow diagram that schematically illustrates a method of identifying the products in the image, in accordance an embodiment of the present invention.

FIG. 3 is a flow diagram that schematically illustrates a method of identifying products 26 in image 43, in according with an embodiment of the present invention. In a capture step 70 camera module 32 captures image 43 of products 26 on shelves 28, and conveys the image to image analysis system 24 via wireless connection 30.

Using an image analysis tool such as an Image to Extensible Markup Language (XML) application (not shown), processor 40 identifies a given price tag 60 on a given shelf 28 in a first identification step 72, identifies a first group 60 of products 26 on the given shelf that are positioned to the left (i.e., a first side) of the given price tag in a second identification step 74, and identifies a second group 60 of products 26 on the given shelf that are positioned to the right (i.e., a second side) of the given price tag in a third identification step 76.

As described herein, processor 40 uses a data structure (e.g., planogram 46) that stores product location information in order to help identify the first and the second group of products. Therefore, in the example shown in FIG. 2, the given price tag identified in step 72 comprises either price tag 60B or price tag 60D. Since there are no products 26 positioned to the left of price tags 60A and 60C, embodiments of the present invention may not be able to accurately identify the products in group 62A and 62C without additional items positioned to the left of those groups. Therefore embodiments of the present invention typically require at least one item 26 positioned on each side of a given price tag 60 in order to identify the items.

To identify the given price tag, processor 40 may compare image 43 to images (not shown) of price tags stored in memory 42, or use defined rules (e.g., identify a "$" in image 43 followed by a numeral). To identify the first and the second groups of products, processor 40 can identify attributes for each of the products such as images, product dimensions, and text printed on the products (e.g., the product's name and weight). Therefore, based on the image analysis, processor 40 can determine a location for the given price tag and the products in the first and the second groups.

In a fourth identification step 78, processor 40 identifies one or more first candidates for the products in the first group, and in a fifth identification step 80, the system processor identifies one or more second candidates for the products in the second group. In some embodiments, processor 40 can identify the first and the second candidates by comparing the images and the attributes for products in the first and the second groups against images 52 and description 54 in product table 44, and setting a low threshold for matching the images and/or the attributes. Therefore, the first candidates comprise potential matches for the products in the first group, and the second candidates comprise potential matches for the products in the second group.

For example, to identify the one or more first candidates, processor 40 can extract, from image 43, a first sub-image comprising a given product 26 in the first group, calculate a first similarity value between the first sub-image and images 52, wherein each of the one or more first candidates comprises a given product identifier 50 whose respective image 52 has a first similarity value greater than or equal to a predefined threshold. Similarly to identify the one or more second candidates, processor 40 can extract, from image 43, a second sub-image comprising a given product 26 in the second group, calculate a second similarity value between the second sub-image and images 52, wherein each of the one or more second candidates comprises a given product identifier 50 whose respective image 52 has a second similarity value greater than or equal to the predefined threshold.

In a retrieval step 82, processor 40 retrieves, from planogram 46, expected locations for products 26 on shelves 28. While the example herein describes using planogram 46 to identify expected locations for the products on the shelves, other data structures configured to indicate expected locations of products 26 on shelves 28 are considered to be within the spirit and scope of the present invention.

In a determination step 84, processor 40 determines a first product identity based on the expected locations and the first product candidates, and determines a second product identity based on the expected locations and the second product candidates. For example, if (as a result of steps 78 and 80) the first candidates to the left of a given price tag 60 are products 26A and 26B, and the second candidates to the right of the given price tag are also products 26A and 26B, then the possible (i.e., left-to-right) sequence of products on the shelf are the tuples (26A, 26A), (26A, 26B), (26B, 26A), and (26B, 26B). If planogram 46 indicates that product 26A should be to the left of product 26B, then the best sequence supported by the planogram is the tuple (26A, 26B). In embodiments of the present invention, the detection of the given price tag indicates a change of the product on the shelves, thereby reducing the possibility that the sequence of products on the shelf is either the tuple (26A, 26A) or the tuple (26B, 26B).

In some embodiments (i.e., when analyzing multiple products on multiple shelves 28 and therefore having multiple instances of first and second candidates), processor 40 can "arrange" the candidates into "rows" that correspond to shelves 28, and then perform a graph theory analysis in order to arrange the candidates in each row as paths, where nodes denote a given candidate's product identifier 50, and edges denote a distance between two given nodes. In some embodiments, processor 40 can calculate the distance as follows:

For a given candidate on a given row, calculate a distance between of a given candidate's scale from its neighbor's candidate scale, and calculate a mean scale of the given row.

Calculate a distance between neighbor candidates on the planogram. For example if product 26A should be to left of product 26B, placing product 26A to the right of product 26B can be identified as a long distance, placing product 26B to right of another product 26B as can be identified as a shorter distance, and placing product 26B to right of product 26A can be identified as a shortest distance.

Calculating the crossing of a given price tag 60 located between two of the candidates, and assuming that all the products between two price tags 60 are identical (i.e., the same product and size), and products the from two sides of a given price tag 60 are typically different from each other.

Calculate a distance from a recognition confidence of 1.00—i.e., the lower the confidence, the longer the edge.

In a presentation step 86, processor 40 conveys the respective product identifiers of the first and the second candidates to wireless device 22, processor 34 presents the respective product identifiers on display 36, and the method ends. In some embodiments, processor 40 can convey all the respective product identifiers of any eliminated first and second candidates and the price tag location to the wireless device, which processor 34 can present on display 36 based on a user's preferences. In additional embodiments processor 40 can receive input from the user indicating a weight factor that can be assigned to the distances described supra.

The flowchart(s) and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method, comprising:
   capturing an image of a shelf and products on the shelf, in a merchandising facility;
   identifying, in the captured image, a shelf, a price tag affixed to the shelf, a first group of one or more first products resting on the shelf and positioned on a first side of the price tag, and a second group of one or more second products resting on the shelf and positioned on a second side of the price tag;
   identifying one or more first candidates for the one or more first products and one or more second candidates for the one or more second products;
   receiving information indicating expected locations for the first and the second candidates;
   determining, based on the expected locations and the one or more first candidates, an identity of the one or more first products;

determining, based on the expected locations and the one or more second candidates, an identity of the one or more second products; and managing the merchandising facility responsive to the determined identities of the first and second products, wherein identifying the one or more second candidates comprises extracting a sub-image comprising a given product from the second group, calculating a similarity value between the sub-image and a plurality of product images having respective product identifiers, and selecting the product identifiers whose respective similarity value is greater than or equal to a predefined threshold.

2. The method according to claim 1, and comprising prior to identifying in the image, receiving the image from a device.

3. The method according to claim 2, and comprising conveying the identities of the one or more first products and the one or more second products to the device, and presenting, on the device, the identities of the one or more first products and the one or more second products.

4. The method according to claim 3, and comprising conveying the one or more first candidates and the one or more second candidates to the device, and presenting the one or more first candidates and the one or more second candidates on the device.

5. The method according to claim 1, wherein receiving the information indicating the expected locations comprises retrieving, from a memory, a planogram comprising the one or more first candidates, the one or more second candidates, and their respective expected locations.

6. A computer system, comprising:
a camera configured to capture an image of a shelf and products on the shelf, in a merchandising facility;
a memory configured to store an image captured by the camera; and
a processor configured:
to identify in the image captured by the camera, a shelf, a price tag affixed to the shelf, a first group of one or more first products resting on the shelf and positioned on a first side of the price tag, and a second group of one or more second products resting on the shelf and positioned on a second side of the price tag;
to identify one or more first candidates for the one or more first products and one or more second candidates for the one or more second products;
to receive information indicating expected locations for the first and the second candidates;
to determine, based on the expected locations and the one or more first candidates, an identity of the one or more first products;
to determine, based on the expected locations and the one or more second candidates, an identity of the one or more second products; and
to manage the merchandising facility responsive to the determined identities of the first and second products,
wherein the processor is configured to identify the one or more second candidates by extracting a sub-image comprising a given product from the second group, calculating a similarity value between the sub-image and a plurality of product images having respective product identifiers, and selecting the product identifiers whose respective similarity value is greater than or equal to a predefined threshold.

7. The computer system according to claim 6, and comprising a device in communication with the computer system and configured to capture the image, and wherein the processor is configured to receive the image from the device.

8. The computer system according to claim 7, wherein the processor is configured to convey the identities of the one or more first products and the one or more second products to the device, and wherein the device comprises a display, and wherein the device is configured to present the identities of the one or more first products and the one or more second products on the display.

9. The computer system according to claim 8, wherein the processor is configured to convey the one or more first candidates and the one or more second candidates to the device, and wherein the device is configured to present, on the display, the one or more first candidates and the one or more second candidates.

10. The computer system according to claim 6, wherein the processor is configured to receive the information indicating the expected locations comprises retrieving, from a memory, a planogram comprising the one or more first candidates, the one or more second candidates, and their respective expected locations.

11. A computer program product, the computer program product comprising:
a non-transitory computer readable storage medium having computer readable program code embodied therewith, the computer readable program code comprising:
computer readable program code configured receive an image of a shelf and products on the shelf, in a merchandising facility, to identify, in the received image, a shelf, a price tag affixed to the shelf, a first group of one or more first products resting on the shelf and positioned on a first side of the price tag, and a second group of one or more second products resting on the shelf and positioned on a second side of the price tag;
computer readable program code configured to identify one or more first candidates for the one or more first products and one or more second candidates for the one or more second products;
computer readable program code configured to receive information indicating expected locations for the first and the second candidates;
computer readable program code configured to determine, based on the expected locations and the one or more first candidates, an identity of the one or more first products;
computer readable program code configured to determine, based on the expected locations and the one or more second candidates, an identity of the one or more second products;
computer readable program code configured to manage the merchandising facility responsive to the determined identities of the first and second products; and
computer readable program code configured prior to identifying in the image, to receive the image from a device, and computer readable program code configured to convey the identities of the one or more first products and the one or more second products to the device, and to present, on the device, the identities of the one or more first products and the one or more second products,
wherein the computer readable program code is configured to identify the one or more first candidates by extracting a sub-image comprising a given product from the first group, calculating a similarity value between the sub-image and a plurality of product images having respective product identifiers, and selecting the product identifiers whose respective similarity value is greater than or equal to a predefined threshold.

12. The computer program product according to claim 11, and comprising computer readable program code configured to convey the one or more first candidates and the one or more second candidates to the device, and to present the one or more first candidates and the one or more second candidates on the device.

13. The computer program product according to claim 11, wherein the computer readable program code is configured to identify the one or more second candidates by extracting a sub-image comprising a given product from the second group, calculating a similarity value between the sub-image and a plurality of product images having respective product identifiers, and selecting the product identifiers whose respective similarity value is greater than or equal to a predefined threshold.

14. The computer program product according to claim 11, wherein the computer readable program code is configured to receive the information indicating the expected locations by retrieving, from a memory, a planogram comprising the one or more first candidates, the one or more second candidates, and their respective expected locations.

15. The method according to claim 1, wherein determining, based on the expected locations and the one or more second candidates, an identity of the one or more second products comprises representing the candidates as nodes of a graph connected by edges denoting distances between the candidates in the received information indicating expected locations, and determining a best matching sequence of candidates from the graph.

\* \* \* \* \*